(12) United States Patent
Ueda

(10) Patent No.: US 8,159,510 B2
(45) Date of Patent: Apr. 17, 2012

(54) LIQUID CRYSTAL DISPLAY

(75) Inventor: Kazuya Ueda, Saitama (JP)

(73) Assignee: Sony Corporation (JP)

( * ) Notice: Subject to any disclaimer, the term of this patent is extended or adjusted under 35 U.S.C. 154(b) by 411 days.

(21) Appl. No.: 12/584,045

(22) Filed: Aug. 28, 2009

(65) Prior Publication Data

US 2010/0060676 A1   Mar. 11, 2010

(30) Foreign Application Priority Data

Sep. 5, 2008   (JP) ................ P2008-228828

(51) Int. Cl.
*G09G 3/36* (2006.01)
(52) U.S. Cl. .................. 345/690; 345/89; 345/694
(58) Field of Classification Search .............. None
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 6,407,791 B1 | 6/2002 | Suzuki et al. | |
| 6,650,390 B2 | 11/2003 | Sakamoto et al. | |
| 7,982,702 B2 * | 7/2011 | Kamada et al. | 345/89 |
| 2008/0309600 A1 * | 12/2008 | Lee et al. | 345/89 |
| 2010/0188441 A1 * | 7/2010 | Lee et al. | 345/690 |

FOREIGN PATENT DOCUMENTS

| | | |
|---|---|---|
| JP | 02-000012 A | 1/1990 |
| JP | 3076938 B2 | 8/2000 |
| JP | 3492582 B2 | 2/2004 |
| JP | 3514219 B2 | 3/2004 |

OTHER PUBLICATIONS

Asia Display, "Domain Divided Vertical Alignment Mode With Optimized Fringe Field Effect", 1998 (pp. 383-386).
"A Super-High Image Quality Multi-Domain Vertical Alignment LCD by New Rubbing-Less Technology", Takeda et al., 4 pages 1998.

* cited by examiner

*Primary Examiner* — Joseph Haley
(74) *Attorney, Agent, or Firm* — Lerner, David, Littenberg, Krumholz & Mentlik, LLP

(57) ABSTRACT

The present invention provides a liquid crystal display including a liquid crystal display panel and a drive section performing divisional drive operation which includes first and second drive operations. The first drive operation performs a driving process with a first drive voltage higher than an original application voltage, and the second drive operation performs a driving process with a second drive voltage lower than the original application voltage. The liquid crystal display panel includes one or more pixel electrodes each having a plurality of slits, and one or more alignment control electrodes provided in one or more regions corresponding to one or more of the slits of the pixel electrode. The alignment control electrode configures a capacitive element in cooperation with the pixel electrode. Electric potential of the pixel electrode is lower than that of the alignment control electrode.

5 Claims, 9 Drawing Sheets

LIQUID CRYSTAL DISPLAY

CROSS-REFERENCE TO RELATED APPLICATION

The present application claims priority from Japanese Patent Application No. JP 2008-228828 filed in the Japanese Patent Office on Sep. 5, 2008, the entire content of which is incorporated herein by reference.

BACKGROUND OF THE INVENTION

1. Field of the Invention

The present invention relates to a liquid crystal display performing display drive by using a TFT (thin film transistor) element.

2. Description of the Related Art

In recent years, as a display monitor in a liquid crystal television, a notebook personal computer, a car navigation system, or the like, there has been proposed a liquid crystal display which employs VA (vertical alignment) mode using vertically-aligned liquid crystal. In VA mode, liquid crystal molecules have a negative dielectric constant anisotropy, that is, the property in which dielectric constant in the long axis direction of the molecules is smaller than that in the short axis direction of the molecules. Thus, it is possible to realize the wide view angle in VA mode, in comparison with TN (twisted nematic) mode.

However, in the liquid crystal display using liquid crystal of VA mode, there is an issue that luminance in the case of viewing a display screen from the front direction differs from a luminance in the case of viewing the display screen from the oblique direction. FIG. 10 indicates the relationship between the gray scale (0 to 255 gray scale levels) and the luminance ratio (luminance ratio to the luminance in the 255 gray scale levels) in an image signal, in the liquid crystal display using liquid crystal of VA mode. As indicated with arrow P101 in the figure, luminance characteristics in the case of viewing the display screen from the front direction (Ys (0°)) are highly differs from luminance characteristics in the case of viewing the display screen from the oblique direction (Ys (45°)) (luminance is shifted high in the case of viewing the display screen from the oblique direction, in comparison with the case of viewing the display screen from the front direction). Such a phenomenon is called "higher luminance shift", "wash out", "color shift" and the like, and this is regarded as a major disadvantage of the liquid crystal display in the case where liquid crystal of VA mode is used.

To improve such a "higher luminance shift" phenomenon, a liquid crystal display is proposed in which a unit pixel is divided to a plurality of sub-pixels, and a threshold in each of the sub-pixels is varied (multi-pixel structure) (for example, U.S. Pat. Nos. 4,840,460 and 5,126,865).

FIG. 11 illustrates an example of the relationship between the gray scale of an image signal and a display state of each sub-pixel, in the multi-pixel structure. In the process when the gray scale is up (luminance increases) from 0 gray scale level (black display state) to 255 gray scale level (white display state), it is understood that the luminance of a part of the pixel (one of the sub-pixels) increases, and then the luminance of the other part of the pixel (other of the sub-pixels) increases. That is, since two thresholds are set in the multi-pixel structure, the variation in gamma characteristics is dispersed. Therefore, as indicated with arrow P102 in FIG. 10, for example, the "higher luminance shift" phenomenon is improved in the luminance characteristics of the 45-degree direction (Ym (45°)) in the multi-pixel structure, in comparison with the luminance characteristics of the 45-degree direction (Ys (45°)) in the typical pixel structure.

Here, the multi-pixel structure indicated in U.S. Pat. Nos. 4,840,460 and 5,126,865 is called HT (halftone gray scale) method by capacitive coupling, and difference in the electric potential between two sub-pixels is determined with capacity ratio.

On the other hand, there is also proposed the multi-pixel structure using two transistors, which is unlike the multi-pixel structure indicated in U.S. Pat. Nos. 4,840,460 and 5,126,865. In this multi-pixel structure, two sub-pixels are driven through different TFTs, connected to gate lines different from each other or data lines different from each other, respectively. That is, two sub-pixels are driven while being electrically perfectly independent from each other. In this multi-pixel structure, the gray scale data of each pixel is substituted according to a value in a predetermined look up table (LUT), or a plurality of types of reference voltages are used in a data driver. Thereby, the drive for each sub-pixel is performed.

In the typical pixel structure, it is proposed that a unit frame in the display drive is temporally divided to a plurality (for example, two) of sub-frames, and the desired luminance is divisionally expressed based on time by using the sub-frame having high luminance and the sub-frame having low luminance. With such a method, it is also possible to obtain the halftone effect similar to that of the multi-pixel structure, and it is known that the "higher luminance shift" phenomenon is improved.

In such a liquid crystal display of VA mode, when a voltage is applied, the liquid crystal molecules aligned vertical to a substrate responds to the voltage by tilting in the direction parallel to the substrate, with the negative dielectric constant anisotropy, and thereby light is transmitted. However, the direction where the liquid crystal molecules aligned vertical to the substrate tilt (director at the time of applying voltage) is arbitrary. Thus, with the voltage application, the alignment of the liquid molecules is disordered, and this is a major factor of deteriorating the response characteristics to the voltage.

As a control means (alignment controller) of the tilting direction in response to the voltage, the technique is disclosed such that insulating projections having inclined surfaces are provided at regular intervals on a substrate, and thereby the liquid molecules are aligned while tilting in a specific direction from the direction vertical to the substrate (MVA-LCD; for example, SID' 98, p. 1077, 1998). Moreover, as another control means (alignment controller), the method is proposed such that a slit (portion with no electrode) is provided in a part of a pixel electrode and a facing electrode. Thus, the voltage is applied to the liquid crystal molecules in the oblique direction (from the oblique electric field), and the alignment direction of the liquid crystal is controlled (PVA-LCD; for example, Asia Display, p. 383, 1998).

Moreover, as another control means (alignment controller), it is proposed that a floating electrode having a slip is provided on a control electrode (for example, U.S. Pat. Nos. 6,650,390 and 6,407,791). Even in the case where this method is used, like the projection in MVA-LCD and the slit in PVA-LCD, it is possible to apply the alignment control capability to the liquid crystal molecules, and the desired alignment control is possible.

SUMMARY OF THE INVENTION

Here, the alignment controllers (the projection and the slit) in U.S. Pat. Nos. 4,840,460 and 5,126,865 are each provided on both of a TFT substrate and a facing substrate. Thus, to obtain symmetric optical characteristics and favorable response characteristics, it is necessary to alternately align and bond the alignment controller on the TFT substrate side and the alignment controller on the facing substrate side with high precision. Accordingly, as a result, there is an issue that a high-precision bonding device is necessary.

On the other hand, in U.S. Pat. Nos. 6,650,390 and 6,407, 791, the alignment controller is provided only on the TFT substrate side, and there is no alignment controller provided on the facing substrate side.

However, in the case where the halftone technique such as the above-described multi-pixel structure is used for a purpose of improving the view angle characteristics of luminance, there is a tendency that the pixel structure is complicated in comparison with the case of the related art. Thus, in the case where the halftone technique is used, to improve the response characteristics to voltage with the alignment controller, bonding technique with higher precision is demanded. Therefore, it is desired to propose a technique which easily improves the view angle characteristics of luminance and the response characteristics.

In view of the foregoing, it is desirable to provide a liquid crystal display capable of easily improving view angle characteristics of luminance and response characteristics.

According to an embodiment of the present invention, there is provided a liquid crystal display including: a liquid crystal display panel including a plurality of pixels each including one or more liquid crystal elements; and a drive section performing display drive by applying voltage based on an input image signal to the liquid crystal elements in each of the pixels. Here, the drive section performs divisional drive operation in which the display drive to each of the pixels is spatially or temporally divided so that the divisional drive operation includes a first drive operation and a second drive operation, the first drive operation performing a driving process with a first drive voltage higher than an original application voltage corresponding to the input image signal, and the second drive operation performing a driving process with a second drive voltage lower than the original application voltage. The liquid crystal display panel includes a TFT substrate and an opposing substrate facing each other, a liquid crystal layer containing liquid crystal of vertical alignment (VA) mode, and sealed up between the TFT substrate and the opposing substrate, one or more pixel electrodes provided for each of the pixels on the TFT substrate, each of the pixel electrodes having a plurality of slits, an opposing electrode provided in common for the pixels on the opposing substrate, one or more alignment control electrodes provided in one or more regions corresponding to one or more of the slits of the pixel electrode on the TFT substrate, the alignment control electrode configuring a capacitive element in cooperation with the pixel electrode, and electric potential of the pixel electrode being lower than that of the alignment control electrode, and the first TFT element provided on the TFT substrate to apply a voltage based on the input image signal to the liquid crystal elements through the capacitive element.

In the liquid crystal display according to the embodiment of the present invention, at time of operation in display drive to the liquid crystal elements in each of the pixels using liquid crystal of VA mode, the display drive to each of the pixels is spatially or temporally divided so that the divisional drive operation includes a first drive operation and a second drive operation. Thereby, the variation (variation as viewed from the front direction of the display screen) in the gamma characteristics (characteristics indicating the relationship between the gray scale and the luminance in the image signal) is dispersed when viewing the display screen from the oblique direction, in comparison with the case where such a divisional drive operation is not performed. Moreover, one or more alignment control electrodes are provided in one or more regions corresponding to one or more of the slits of the pixel electrode on the TFT substrate, and electric potential of the pixel electrode is lower than that of the alignment control electrode. Thereby, in the liquid crystal layer, the electric field in a region corresponding to the alignment control electrode is larger than that in other region. Thus, without arranging an alignment controller (for example, a projection and a slit) on the facing substrate side, it is possible to apply the alignment control capability to the liquid crystal molecules in the liquid crystal layer.

In the liquid crystal display according to the embodiment of the present invention, at time of operation in display drive to the liquid crystal elements in each of the pixels using liquid crystal of VA mode, the display drive to each of the pixels is spatially or temporally divided so that the divisional drive operation includes a first drive operation and a second drive operation. Thereby, it is possible to disperse the variation in the gamma characteristics when viewing the display screen from the oblique direction, in comparison with the case where such a division drive is not performed, and it is possible to improve the view angle characteristics of the luminance. Moreover, one or more alignment control electrodes are provided in one or more regions corresponding to one or more of the slits of the pixel electrode on the TFT substrate, and electric potential of the pixel electrode is lower than that of the alignment control electrode. Thus, without arranging an alignment controller on the facing substrate side, it is possible to apply the alignment control capability to the liquid crystal molecules in the liquid crystal layer, and it is possible to improve the response characteristics with the simple configuration. Therefore, it is possible to easily improve the view angle characteristics of the luminance and the response characteristics.

Other and further objects, features and advantages of the invention will appear more fully from the following description.

DETAILED DESCRIPTION OF THE PREFERRED EMBODIMENT

A preferred embodiment of the present invention will be described in detail with reference to the accompanying drawings.

Figure 1:
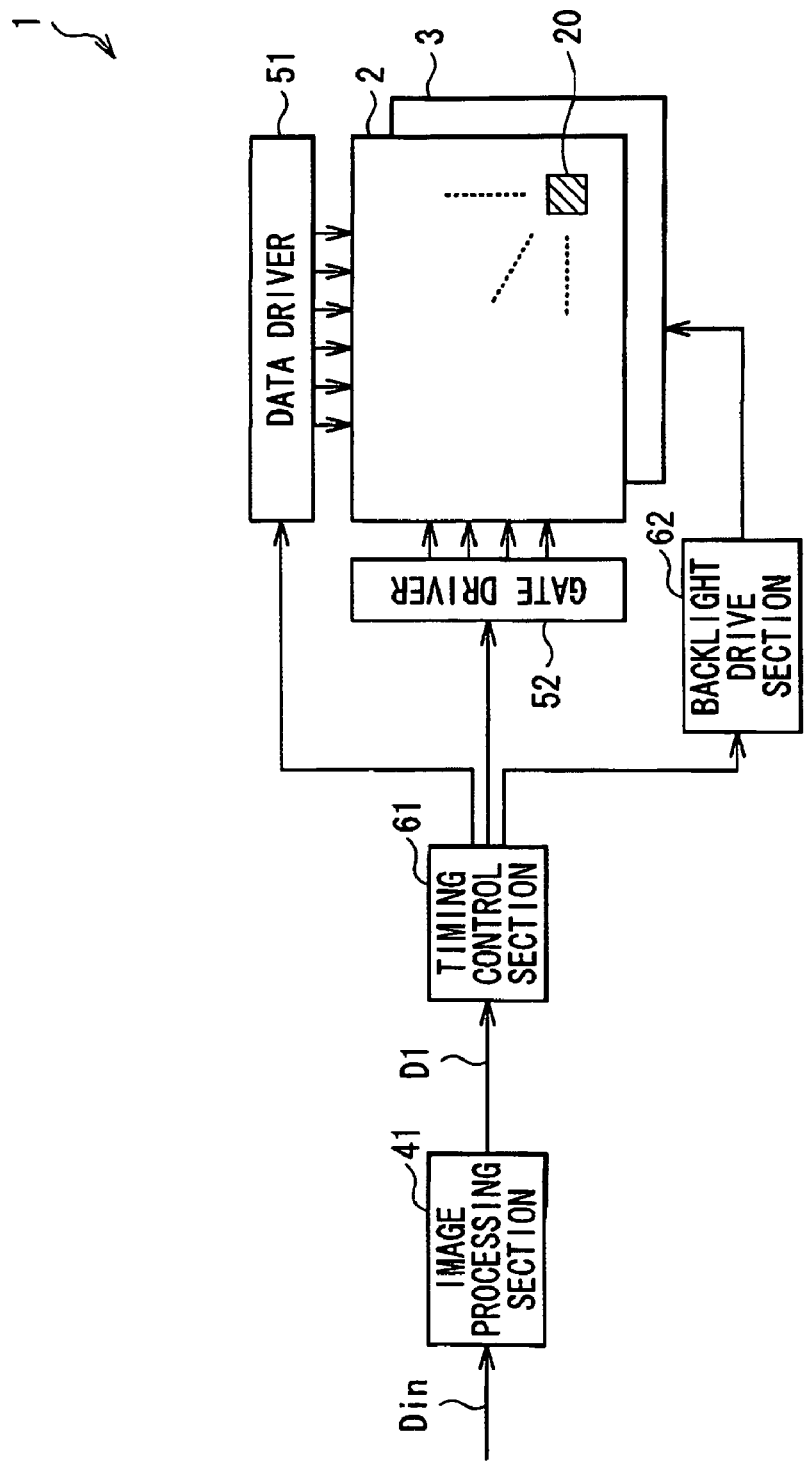
FIG. 1 is a block diagram illustrating the overall configuration of a liquid crystal display according to an embodiment of the present invention.

FIG. 1 illustrates the overall configuration of a liquid crystal display (liquid crystal display 1) according to an embodiment of the present invention. The liquid crystal display 1 includes a liquid crystal display panel 2, a backlight 3, an image processing section 41, a data driver 51, a gate driver 52, a timing control section 61, and a backlight drive section 62.

The backlight 3 is a light source applying light to the liquid crystal display panel 2, and includes a CCFL (cold cathode fluorescent lamp), an LED (light emitting diode), or the like.

In response to a drive signal supplied from the gate driver 52 which will be described later, the liquid crystal display panel 2 modulates light emitted from the backlight 3 based on a drive voltage supplied from the data driver 51, and thereby performs an image display based on an image signal Din. The liquid crystal display panel 2 includes a plurality of pixels 20 which are arranged in a matrix state as a whole. Each of the pixels 20 is configured with a pixel corresponding to R (red), G (green), or B (blue) (a pixel provided with a color filter for R, G, or B, which is not illustrated in the figure, and a pixel emitting display light of R, G, or B).

The image processing section 41 performs a predetermined image processing to the image signal Din from the outside, and thereby generates an image signal D1 which is an RGB signal.

In response to timing control by the timing control section 61, the gate driver 52 line-sequentially drives each of the pixels 20 in the liquid crystal display panel 2, along a scanning line (gate line G which will be described later) which is not illustrated in the figure.

The data driver 51 supplies a drive voltage based on the image signal D1 supplied from the timing control section 61, to each of the pixels 20 in the liquid crystal display panel 2. Specifically, the data driver 51 performs D/A conversion to the image signal D1, and thereby generates an image signal (the above-described drive voltage) which is an analogue signal and outputs the image signal to each of the pixels 20.

The backlight drive section 62 controls lighting operation (light emission operation) of the backlight 3. The timing control section 61 controls drive timing of the gate driver 52 and the data driver 51, and supplies the image signal D1 to the data driver 51.

Figure 2:
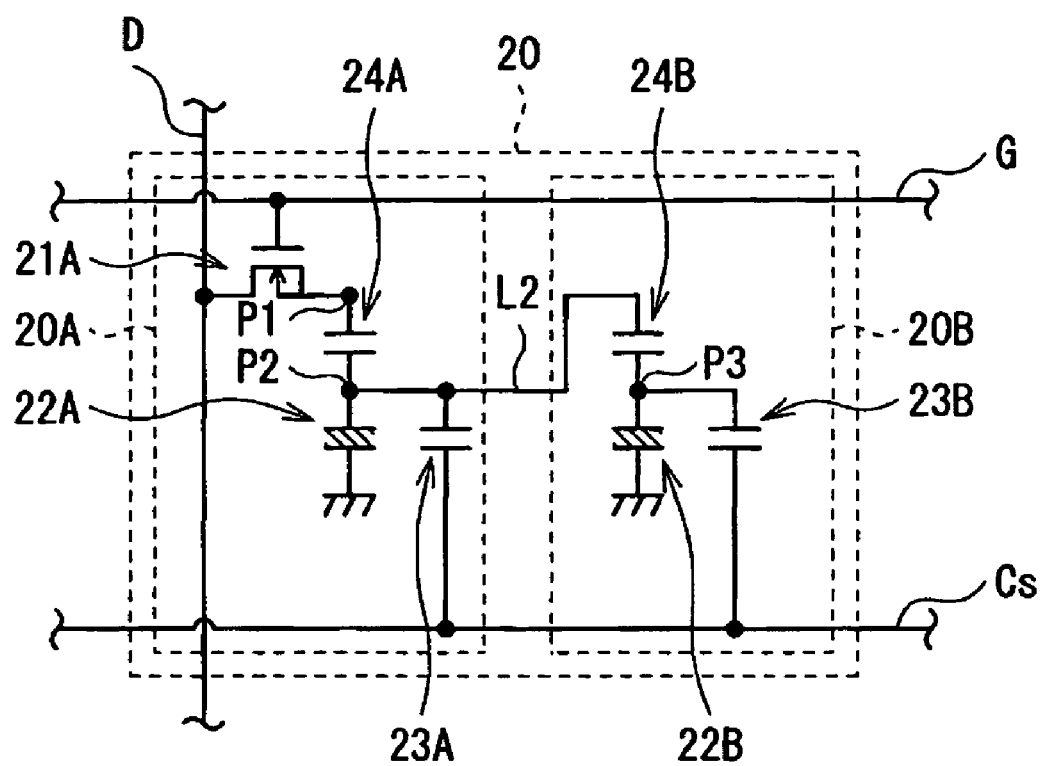
FIG. 2 is a circuit diagram illustrating the detailed configuration of a pixel indicated in FIG. 1.

Next, with reference to FIG. 2, the configuration of a pixel circuit formed in each of the pixels 20 will be described in detail. FIG. 2 illustrates an example of the circuit configuration of the pixel circuit in each of the pixels 20.

The pixel 20 is configured with two sub-pixels 20A and 20B, and has a multi-pixel structure. The sub-pixel 20A includes a liquid crystal element 22A as being a main capacitive element, an auxiliary capacitive element 23A, a capacitive element 24A, and a thin film transistor (TFT) element 21A. Meanwhile, the sub-pixel 20B includes a liquid crystal element 22B as being a main capacitive element, an auxiliary capacitive element 23B, and a capacitive element 24B. A gate line G, a data line D, and an auxiliary capacitive line Cs are connected to the pixel 20, the gate line G line-sequentially selecting a pixel to be driven, the data line D supplying a drive voltage (drive voltage supplied from the data driver 51) to the sub-pixels 20A and 20B in the pixel 20 to be driven, and the auxiliary capacitive line Cs as being a bus line supplying a predetermined reference electric potential to a facing electrode side of each of the auxiliary capacitive elements 23A and 23B.

The liquid crystal element 22A serves as a display element performing operation for display (emitting display light), in accordance with a drive voltage supplied from the data line D to one end of the liquid crystal element 22A through the TFT element 21A and the capacitive element 24A. Meanwhile, the liquid crystal element 22B serves as a display element performing operation for display (emitting display light), in accordance with a drive voltage supplied from the data line D to one end of the liquid crystal element 22B through the TFT element 21A and the capacitive elements 24A and 24B. These liquid crystal elements 22A and 22B each include, as will be described later in detail, a liquid crystal layer (not illustrated in the figure) which is made of liquid crystal of VA mode, and a pair of electrodes (not illustrated in the figure) with this liquid crystal layer in between. One (one end) side of the pair of electrodes (sub-pixel electrode 204A side which will be described later) in the liquid crystal element 22A is connected to a connection point P2, and the other (other end) side of the pair of electrodes (facing electrode 208 side which will be described later) is grounded. One (one end) side of the pair of electrodes (sub-pixel electrode 204B side which will be described later) in the liquid crystal element 22B is connected to a connection point P3, and the other (other end) side of the pair of electrodes (facing electrode 208 side which will be described later) is grounded.

The auxiliary capacitive elements 23A and 23B are capacitive elements stabilizing accumulated electric charge of the liquid crystal elements 22A and 22B, respectively. One end of the auxiliary capacitive element 23A is connected to the connection point P2 and one end of the capacitive element 24B which will be described later, through a wiring L2. The other end of the auxiliary capacitive element 23A is connected to the auxiliary capacitive line Cs. One end of the auxiliary capacitive element 23B is connected to the connection point P3. The other end of the auxiliary capacitive element 23B is connected to the auxiliary capacitive line Cs.

The TFT element 21A is configured with a MOS-FET (metal oxide semiconductor-field effect transistor). In the TFT element 21A, a gate is connected to the gate line G, a source is connected to a connection point P1, and a drain is connected to the data line D. The TFT element 21A serves as a switching element supplying drive voltages (drive voltage based on the image signal D1) for the pixel 20, to one end of the liquid crystal element 22A, one end of the auxiliary capacitive element 23A, and one end of the capacitive element 24B which will be described later, respectively, through the capacitive element 24A which will be described later. Specifically, in response to a selection signal supplied from the gate driver 52 through the gate line G, the TFT element 21A selectively allows electrical connection between the data line D and one end of the capacitive element 24A (connection point P1). In the pixel 20 according to the embodiment, the TFT element (TFT element 21A) as a switching element is arranged in only the sub-pixel 20A.

In the capacitive element 24A, one end is connected to the connection point P1 (alignment control electrode 202A side which will be described later), and the other end is connected to the connection point P2 (sub-pixel electrode 204A side which will be described later, in the liquid crystal element 22A). As will be described later in detail, the capacitive element 24A sets the electric potential of the alignment control electrode 202A higher than that of the sub-pixel electrode 204A (electric potential of the sub-pixel electrode 204A is lowered than that of the alignment control electrode 202A).

In the capacitive element 24B, one end is connected to the connection point P2 (alignment control electrode 202B and the sub-pixel electrode 204A side, which will be described later) through the wiring L2, and the other end is connected to the connection point P3 (sub-pixel electrode 204B side which will be described later, in the liquid crystal element 22B). The capacitive element 24B has two functions. As one of the functions, to realize the halftone effect, the capacitive element 24B serves as a coupling capacitive element so that drive voltages different from each other are applied to the sub-pixel 20A and the sub-pixel 20B (specifically, to the liquid crystal element 22A and the auxiliary capacitive element 23A, and the liquid crystal element 22B and the auxiliary capacitive element 23B), respectively. As the other of the functions, which will be described later in detail, the capacitive element 24B sets the electrical potential of the alignment control electrode 202B higher than that of the sub-pixel electrode 204B (electric potential of the sub-pixel electrode 204B is lowered than that of the alignment control electrode 202B). In such a manner, since the capacitive element 24B combines two functions, the circuit configuration of the pixel 20 is simplified.

Figure 3:
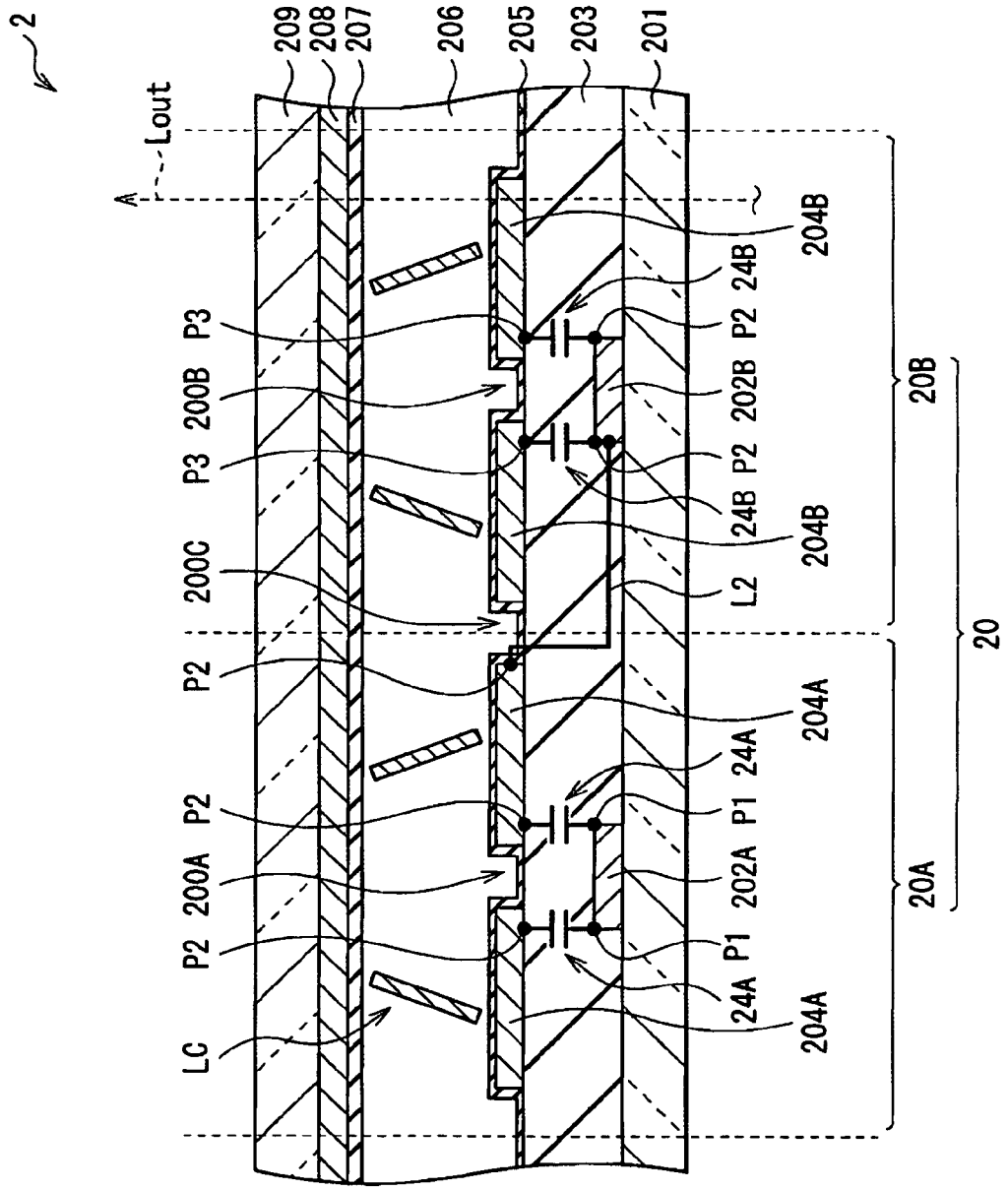
FIG. 3 is a cross-sectional view illustrating the detailed configuration of the pixel indicated in FIG. 1.

Next, with reference to FIG. 3, the cross-sectional configuration of each pixel 20 in the liquid crystal display panel 2 will be described in detail. FIG. 3 schematically illustrates an example of the cross-sectional configuration of the pixel 20 in the liquid crystal display panel 2.

In the liquid crystal display panel 2, a liquid crystal layer 206 containing liquid crystal molecules LC is sealed between a TFT substrate 201 and a facing substrate (CF (color filter) substrate) 209 facing each other.

The TFT substrate 201 is made of, for example, a glass substrate. On the TFT substrate 201, the sub-pixel electrodes 204A and 204B are arranged with the alignment control electrodes 202A and 202B and the insulating layer 203 in between. Moreover, on the TFT substrate 201, the above-described TFT element 21A (not illustrated in the figure) is arranged in the pixel 20 unit. The alignment control electrode 202A and the sub-pixel electrode 204A are arranged in the sub-pixel 20A, while the alignment control electrode 202B and the sub-pixel electrode 204B are arranged in the sub-pixel 20B.

The insulating layer 203 is formed between the TFT substrate 201 and the alignment control electrodes 202A and 202B, and the sub-pixel electrodes 204A and 204B. The insulating layer 203 is made of, for example, silicon nitride (SiN), silicon oxide (SiO), or the like.

The sub-pixel electrodes 204A and 204B are, for example, electrodes of ITO (indium tin oxide) or the like, which has transparency. Both of the sub-pixel electrodes 204A and 204B are floating electrodes with respect to the TFT element 21A (not illustrated in FIG. 3; electrically connected to the alignment control electrode 202A which will be described later). In the sub-pixel electrode 204A, a plurality of slits 200A are arranged, and in the sub-pixel electrode 204B, a plurality of slits 200B are arranged. Between the sub-pixel electrodes 204A and 204B, a slit 200C is arranged.

On the TFT substrate 201, the alignment control electrode 202A is arranged in a region corresponding to one or more of the plurality of slits 200A. On the TFT substrate 201, the alignment control electrode 202B is arranged in a region corresponding to one or more of the plurality of slits 200B. That is, such an alignment control electrode 202A is arranged in each sub-pixel 20A, and such an alignment control electrode 202B is arranged in each sub-pixel 20B. The alignment control electrodes 202A and 202B are made of, for example, metal material such as Al (aluminum). Here, the above-described capacitive element 24A is formed in a region where the sub-pixel electrode 204A and the alignment control electrode 202A face each other (between the connection points P1 and P2 in FIG. 3), with the insulating layer 203 in between. The above-described capacitive element 24B is formed in a region where the sub-pixel electrode 204B and the alignment control electrode 202B face each other (between the connection points P2 and P3 in FIG. 3), with the insulating layer 203 in between. The sub-pixel electrode 204A in the sub-pixel 20A and the alignment control electrode 202B in the sub-pixel 20B are electrically connected to each other through the wiring L2, and have electric potential equal to each other. Thereby, in the embodiment, electric potential V (P2) of the sub-pixel electrode 204A is lower than electric potential V (P1) of the alignment control electrode 202A, and electric potential V (P3) of the sub-pixel electrode 204B is lower than electric potential V (P2) of the alignment control electrode 202B.

Like the TFT substrate 201, the facing substrate 209 is made of, for example, a glass substrate. On the facing substrate 209, for example, a color filter (not illustrated in the figure) in which filters of red (R), green (G), and blue (B) are arranged in a stripe state, and the facing electrode 208 which is common to each of the pixels 20 are arranged.

Like the sub-pixel electrodes 204A and 204B, the facing electrode 208 is, for example, an electrode of ITO or the like, which has transparency, and is arranged in common in each of the pixels 20, on the facing substrate 209. However, unlike the sub-pixel electrodes 204A and 204B, the facing electrode 208 is not provided with a slit.

A vertical alignment film 205 is formed on the sub-pixel electrodes 204A and 204B on the TFT substrate 201 side, and a vertical alignment film 207 is formed on the facing electrode 208 on the facing substrate 209 side. The vertical alignment films 205 and 207 are made of, for example, organic material such as polyimide, and align the liquid molecules LC in the direction vertical to the substrate surface.

The liquid crystal layer 206 is made of vertical-alignment liquid crystal (liquid crystal of VA mode), and contains, for example, the liquid crystal molecules LC having a negative dielectric constant anisotropy. This liquid crystal molecule LC has such a property that the dielectric constant in the short axis direction is larger than the dielectric constant in the long axis direction. With this property, when the drive voltage applied between the sub-pixel electrodes 204A and 204B, and the facing electrode 208 is turned off, the long axis of the liquid crystal molecule LC is aligned substantially vertical to the substrate. On the other hand, when the drive voltage is turned on, the long axis of the liquid crystal molecule LC is inclined and aligned so as to be substantially parallel to the substrate.

Here, the timing control section 61, the data driver 51, and the gate driver 52 correspond to a specific example of "a drive section" according to the embodiment of the present invention. The sub-pixel 20A corresponds to a specific example of "a first sub-pixel group" and "a first sub-pixel" according to the embodiment of the present invention. The sub-pixel 20B corresponds to a specific example of "a second sub-pixel group" and "a second sub-pixel" according to the embodiment of the present invention. The TFT element 21A corresponds to a specific example of "a first TFT element" according to the embodiment of the present invention.

Next, operation and effects of the liquid crystal display 1 according to the embodiment will be described.

As indicated in FIG. 1, in the liquid crystal display 1, the image signal Din supplied from the outside is subjected to the image processing in the image processing section 41, and the image signal D1 for each pixel 20 is generated. The image signal D1 is supplied to the data driver 51 through the timing control section 61. In the data driver 51, the D/A conversion is performed to the image signal D1, and an image signal as being an analogue signal is generated. Based on this image signal, the display drive operation for each pixel 20 is line-sequentially performed with the drive voltage output from the gate driver 52 and the data driver 51 to each pixel 20.

Specifically, as indicated in FIG. 2, in accordance with the selection signal supplied from the gate driver 52 through the gate line G, the operation state and the non-operation state (on/off) of the TFT element 21A is switched, and, selectively, the data line D is electrically connected to the liquid crystal elements 22A and 22B and the auxiliary capacitive elements 23A and 23B, through the capacitive elements 24A and 24B. Thereby, the drive voltage based on the image signal supplied from the data driver 51 is supplied to the liquid crystal elements 22A and 22B, and the display drive operation is performed.

As indicated in FIG. 3, in the pixel 20 where the data line D is electrically connected to the liquid crystal elements 22A and 22B and the auxiliary capacitive elements 23A and 23B, through the capacitive elements 24A and 24B, illumination light Lout from the backlight 3 is modulated in the liquid crystal display panel 2, and output as display light. Thereby, the image display based on the image signal Din is performed in the liquid crystal display 1.

Here, in the embodiment, as indicated in FIGS. 2 and 3, at the time of display drive to the liquid crystal elements 22A and 22B in each pixel 20, the display drive to each pixel 20 is spatially divided into two, and performed, based on the image signal D1. Specifically, for example, as indicated with arrows P10a and P10b in FIG. 4, with the capacitive element 24B serving also as a coupling capacitive element based on the image signal D1, the drive voltage corresponding to an imaginary image signal D2a in the figure is applied to the sub-pixel 20A, and the drive voltage corresponding to an imaginary image signal D2b in the figure is applied to the sub-pixel 20B. Thereby, the drive voltages different from each other are applied to the sub-pixels 20A and 20B.

Figure 4:
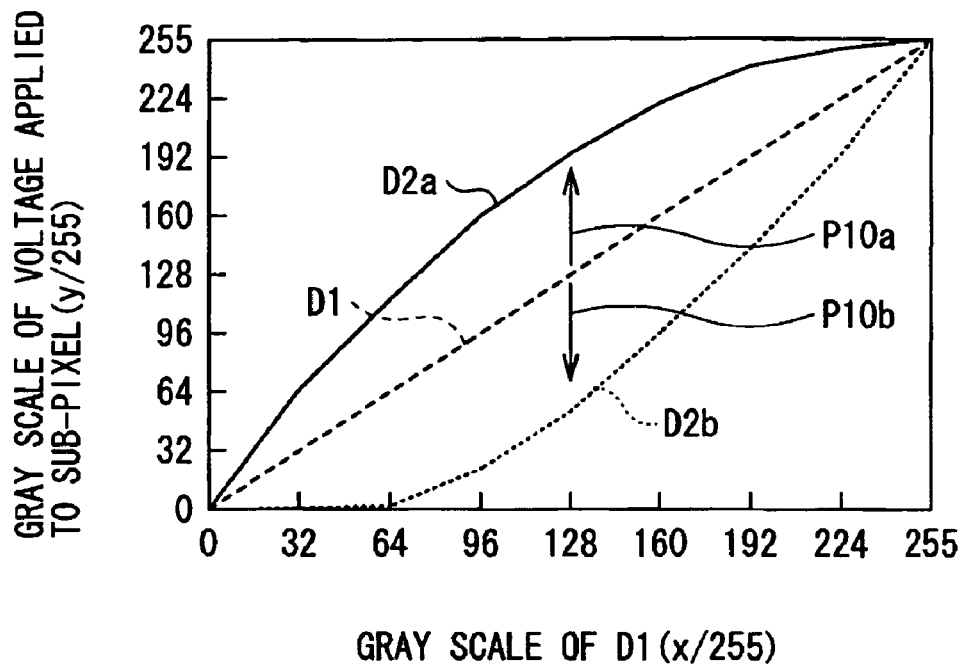
FIG. 4 is a characteristic view illustrating an example of the relationship between an image signal supplied to each pixel and a voltage applied to each sub-pixel.

More specifically, as indicated in FIG. 4, the divisional drive operation at this time includes a first drive operation (divisional drive operation to the sub-pixel 20A) and a second drive operation (divisional drive operation to the sub-pixel 20B). In the first drive operation, the divisional drive operation is performed so that the liquid crystal application voltage applied to the liquid crystal element 22A is equal to or higher than the input application voltage corresponding to the image signal D1, and on the high voltage side. In the second drive operation, the divisional drive operation is performed so that the liquid crystal application voltage applied to the liquid crystal element 22B is equal to or lower than the above-described input application voltage, and on the low voltage side. This is because, both of the sub-pixel electrodes 204A and 204B are floating electrodes to the TFT element 21A. That is, since the sub-pixel electrodes 204A and 204B are the floating electrodes, when the input application voltage corresponding to the image signal D1 is applied to the alignment control electrode 202A, the voltage is divided according to the capacity ratio between the liquid crystal element 22A and the liquid crystal element 22B, or according to the capacity ratio between the auxiliary capacitive element 23A and the auxiliary capacitive element 23B, and the divided voltages are applied to the sub-pixel electrodes 204A and 204B, respectively.

Thereby, in the embodiment, the variation (variation as viewed from the front direction of the display screen) in the gamma characteristics (characteristics indicating the relationship between the gray scale in the luminance levels and the brightness (luminance) in the image signal D1) is dispersed when viewing the display screen from the oblique direction (for example, the 45-degree direction), in comparison with the case where such a division drive is not performed. Therefore, the view angel characteristics of the luminance improve in comparison with the case where the division drive is not performed.

In the embodiment, the alignment control electrode 202A is arranged in a region corresponding to one or more of the plurality of slits 200A in the sub-pixel electrode 204A on the TFT substrate 201, and the alignment control electrode 202B is arranged in a region corresponding to one or more of the plurality of slits 200B in the sub-pixel electrode 204B on the TFT substrate 201. Moreover, the electric potential V (P2) of the sub-pixel electrode 204A is lower than the electric potential V (P1) of the alignment control electrode 202A, and the electric potential V (P3) of the sub-pixel electrode 204B is lower than the electric potential V (P2) of the alignment control electrode 202B.

Thereby, in the liquid crystal layer 206, the electric field in a region corresponding to the alignment control electrodes 202A and 202B is larger than the electric field in other region. Thus, the alignment control operates in the direction opposite (or different) from that of the alignment control generated in the slit structure of the related art, and the desired alignment division is stably realized. Therefore, as indicated in FIG. 3, when the voltage is applied between the sub-pixel electrodes 204A and 204B, and the facing electrode 208, the oblique electric field in the direction opposite from that of typical cases is generated on the slit 200A and the slit 200B. That is, the oblique electric field in the direction opposite from that of the slit 200C is generated. As a result, each liquid crystal molecule LC is aligned so as to incline from the direction vertical to the substrate surface to the direction of the slit 200A or the direction of the slit 200B. In this manner, without arranging an alignment controller (for example, a projection and a slit) on the facing substrate 209 side, it is possible to apply the alignment control capability to the liquid crystal molecules LC in the liquid crystal layer 206.

As described above, in the embodiment, at the time of performing operation in the display drive to the liquid crystal elements 22A and 22B in each pixel 20 using the liquid crystal of VA mode, the divisional drive operation is performed by spatially dividing the display drive of each pixel 20. Thus, it is possible to disperse the variation in the gamma characteristics when viewing the display screen from the oblique direction, and it is possible to improve the view angel characteristics of the luminance, in comparison with the case where such a divisional drive operation is not performed. The alignment control electrode 202A is arranged in a region corresponding to one or more of the plurality of slits 200A in the sub-pixel electrode 204A on the TFT substrate 201, and the alignment control electrode 202B is arranged in a region corresponding to one or more of the plurality of slits 200B in the sub-pixel electrode 204B on the TFT substrate 201. Moreover, the electric potential V (P2) of the sub-pixel electrode 204A is lower than the electric potential V (P1) of the alignment control electrode 202A, and the electric potential V (P3) of the sub-pixel electrode 204B is lower than the electric potential V (P2) of the alignment control electrode 202B.

Thus, without arranging an alignment controller on the facing substrate 209 side, it is possible to apply the alignment control capability to the liquid crystal molecules LC in the liquid crystal layer 206, and it is possible to improve the response characteristics with the simple configuration. Therefore, it is possible to easily improve the view angel characteristics of the luminance and the response characteristics.

Since there is no alignment controller on the facing substrate 209 side, it is possible to bond the TFT substrate 201 and the facing substrate 209 with the simple process, while maintaining the high improvement effect of higher luminance shift.

Since such a simple process is realized, reduction in the process time and simplification of the bonding device are realized. Thus, it is possible to reduce the cost while maintaining the high improvement effect of higher luminance shift.

Since such a simple process is realized, it is also possible to increase the size of the substrate and the panel, while maintaining the high improvement effect of higher luminance shift.

Moreover, in the pixel 20 according to the embodiment, since the capacitive element 24B combines two functions as described above, the circuit configuration of the pixel 20 is simplified. Thus, it is possible to increase the aperture ratio in the pixel 20, and it is possible to increase the luminance. Alternatively, it is possible to reduce the cost by simplifying the configuration of the backlight 3.

Next, some modifications of the present invention will be described. In these modifications, same reference numerals as in the above embodiment are used to indicate substantially identical components, and thereby the description is appropriately omitted.

MODIFICATION 1

Figure 5:
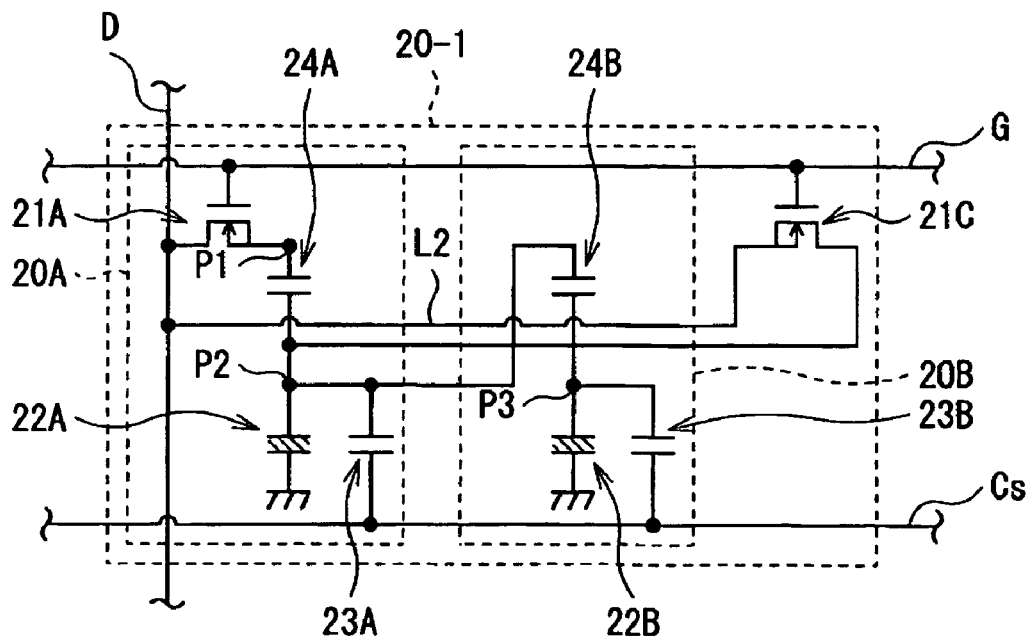
FIG. 5 is a circuit diagram illustrating the configuration of a pixel according to modification 1 of the present invention.

FIG. 5 illustrates a pixel circuit of a pixel (pixel 20-1) according to modification 1 of the present invention.

In modification 1, a TFT element 21C (second TFT element) is arranged in each pixel 20-1, so as to electrically connect each sub-pixel electrode 204A and each sub-pixel electrode 204B (connection points P2 and P3 in FIG. 5), and a data line D, in response to the control of the gate line G. In the embodiment, since the sub-pixel elements 204A and 204B are floating electrodes to the TFT element 21A, there is an issue that the liquid crystal layer 206 is easily burned. To avoid this issue, the TFT element 21C serves as a circuit preventing the burning. Except for the points described above, the circuit configuration is the same as that of the pixel 20 in the embodiment.

In modification 1, with such a configuration, since each of the sub-pixel electrodes 204A and 204B is not a floating electrode, it is possible to avoid the issue of burning. Moreover, by adjusting the writing capability of the TFT element 21C, and the capacity of the capacitive elements 24A and 24B, it is possible to realize the improvement effect of higher luminance shift, which is similar to that of the embodiment, while avoiding the issue of burning.

In such a burning prevention circuit, the circuit configuration is not limited as indicated in modification 1, and other circuit configuration may be employed.

MODIFICATIONS 2 and 3

Figure 6:
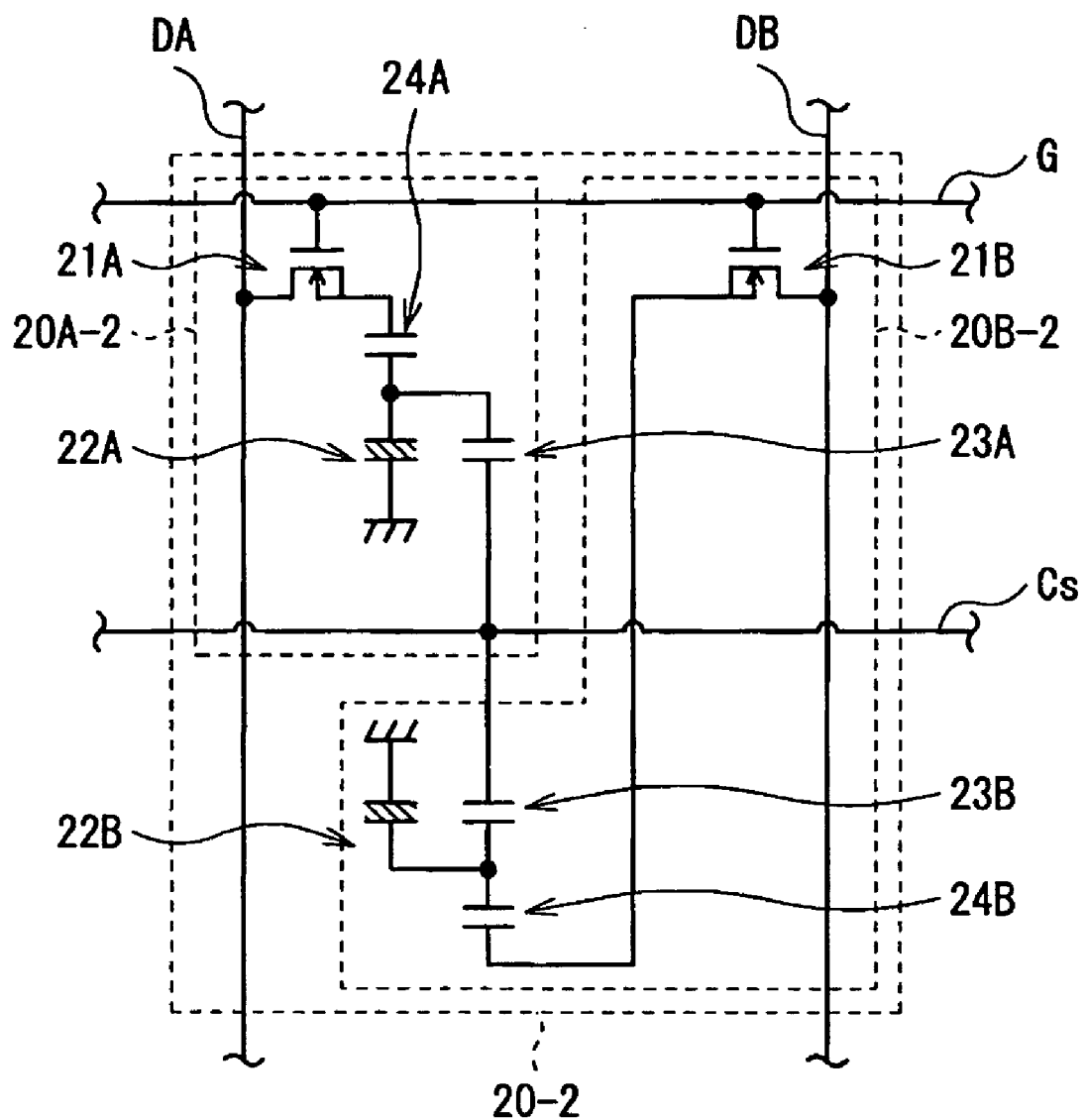
FIG. 6 is a circuit diagram illustrating the configuration of a pixel according to modification 2 of the present invention.
Figure 7:
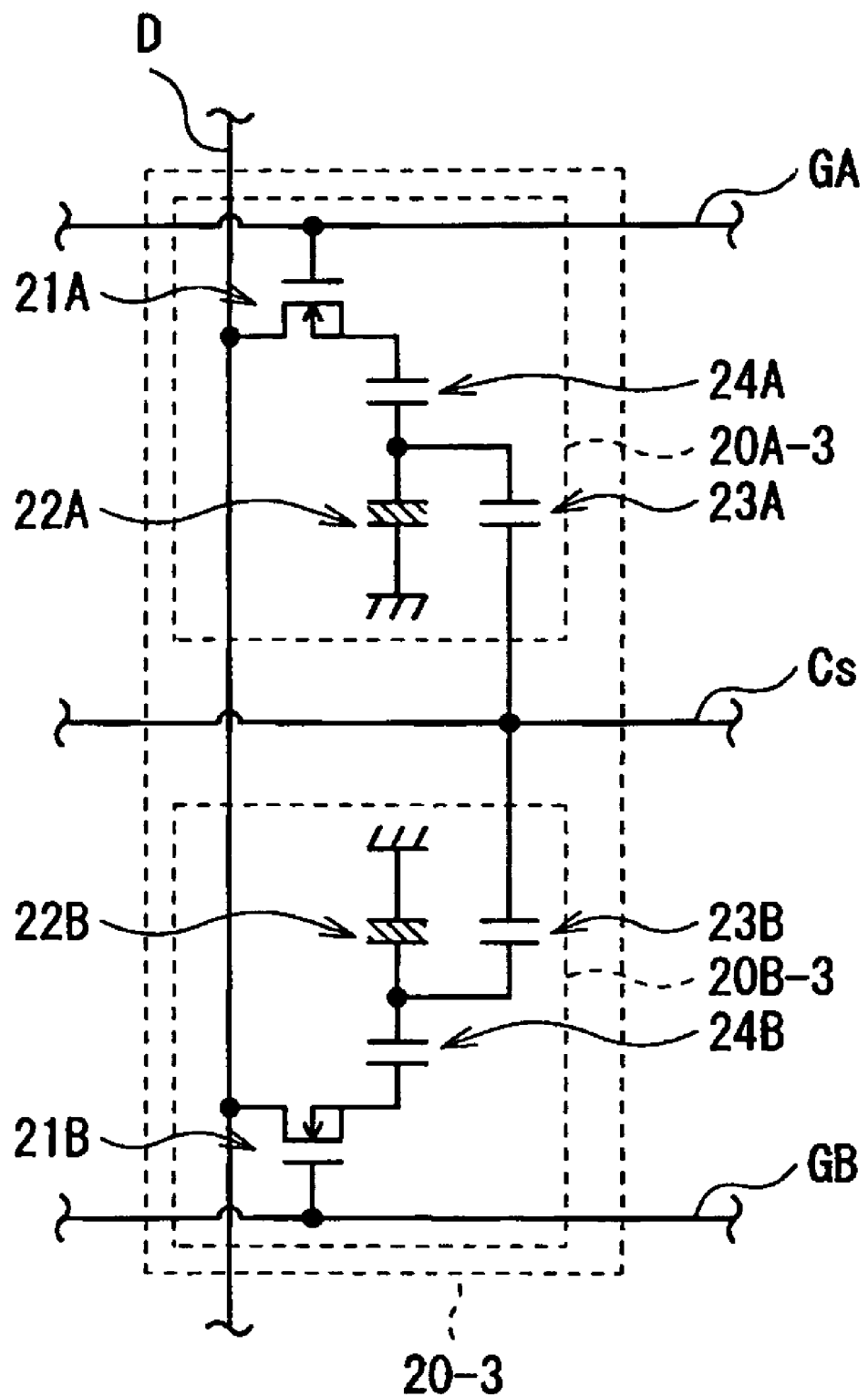
FIG. 7 is a circuit diagram illustrating the configuration of a pixel according to modification 3 of the present invention.

FIG. 6 illustrates a pixel circuit of a pixel (pixel 20-2) according to modification 2 of the present invention. FIG. 7 illustrates a pixel circuit of a pixel (pixel 20-3) according to modification 3 of the present invention.

In modification 2 indicated in FIG. 6, each pixel 20-2 (configured with sub-pixels 20A-2 and 20B-2) has the multi-pixel structure in which one gate line G and two data lines DA and DB are connected to each pixel 20-2. In the pixel 20-2, a TFT element (TFT elements 21A and 21B) is arranged in both the sub-pixel 20A-2 and the sub-pixel 20B-2.

On the other hand, in modification 3 indicated in FIG. 7, each pixel 20-3 (configured with sub-pixels 20A-3 and 20B-3) has the multi-pixel structure in which two gate lines GA and GB and one data line D are connected to each pixel 20-3. In the pixel 20-3, a TFT element (TFT elements 21A and 21B) is also arranged in both the sub-pixels 20A-3 and 20B-3. In the case of such a pixel 20-3, for example, a unit frame (one frame period) of display drive is divided into two on the time base, and thereby two sub-frame periods are provided. Moreover, in each sub-frame period, the sub-pixel 20A-3 is driven in response to a selection signal supplied from the gate line GA and the drive voltage supplied from a data driver D, and the sub-pixel 20B-3 is driven in response to a selection signal supplied from the gate line GB and the drive voltage supplied from the data driver D.

In this manner, even in the case of the multi-pixel structure including two TFT elements like modifications 2 and 3, by providing the capacitive elements 24A and 24B, it is possible to apply the alignment control capability to liquid crystal molecules, which is similar to that of the embodiment.

Even in the pixel 20-2 in modification 2 and the pixel 20-3 in modification 3, the burning prevention circuit as indicated in modification 1 may be arranged.

MODIFICATION 4

Figure 8:
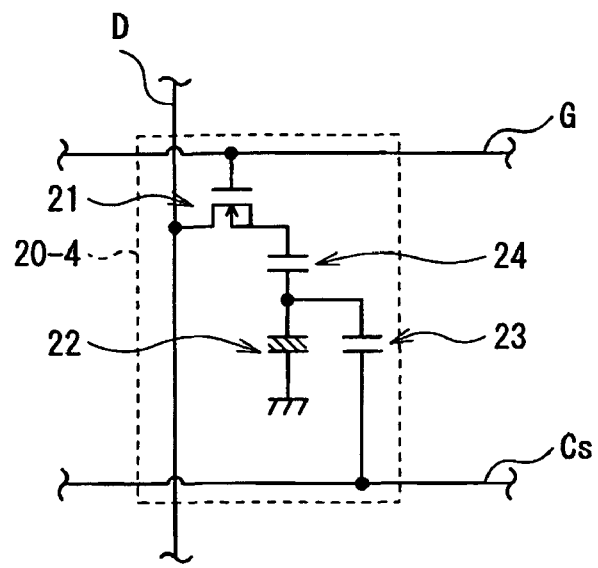
FIG. 8 is a circuit diagram illustrating the configuration of a pixel according to modification 4 of the present invention.

FIG. 8 illustrates a pixel circuit of a pixel (pixel 20-4) according to modification 4 of the present invention.

In modification 4, a pixel 20-4 is a pixel having a typical single structure (includes one liquid crystal element 22, one auxiliary capacitive element 23, and one TFT element 21, and one gate line G and one data line D are connected to a pixel). In each pixel 20-4, one capacitive element 24 is arranged.

Figure 9:
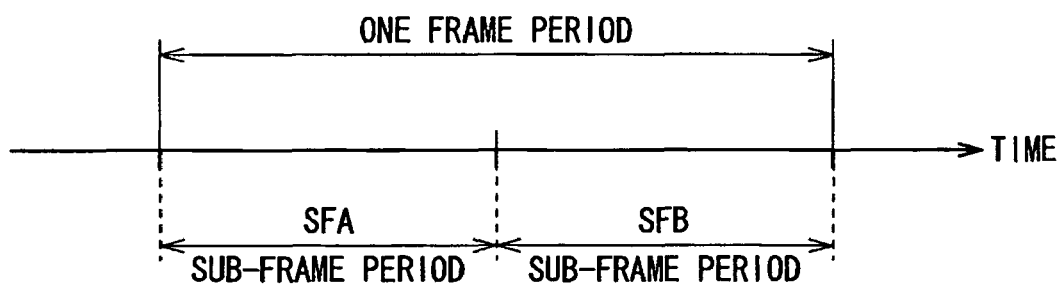
FIG. 9 is a timing view for explaining a sub-frame period at the time of display drive according to modification 4 indicated in FIG. 8.
Figure 10:
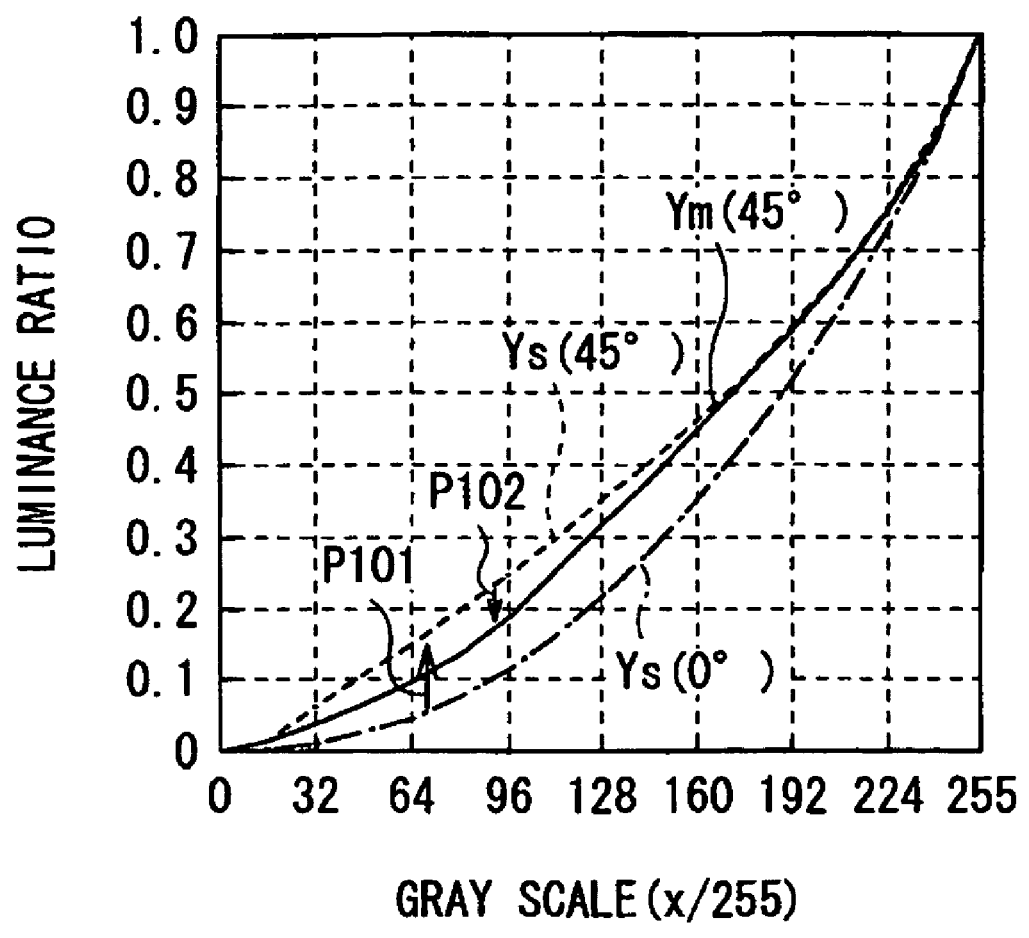
FIG. 10 is a characteristic view illustrating an example of the relationship between a gray scale of an image signal and luminance ratio as viewing a liquid crystal display panel from the front direction and the 45-degree direction, in a liquid crystal display of the related art.
Figure 11:
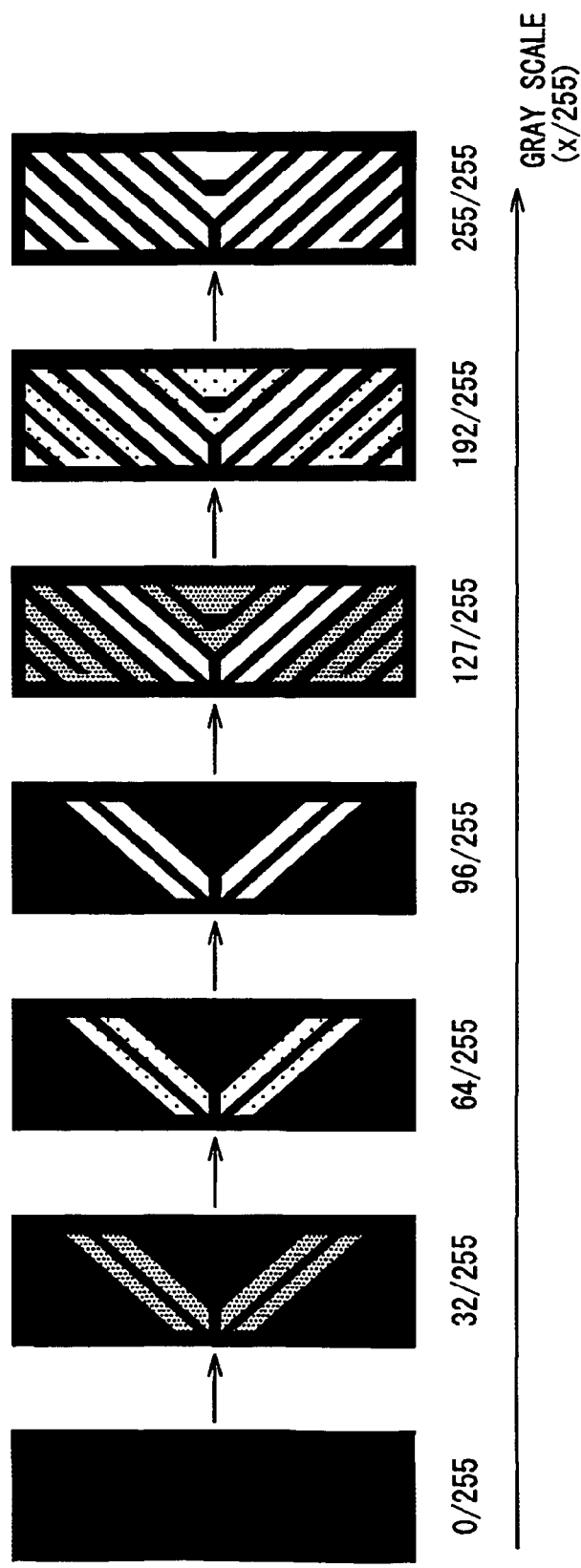
FIG. 11 is a plan view illustrating an example of the relationship between a gray scale of an image signal and a display state of each sub-pixel, in a multi-pixel structure of the related art.

However, for example as indicated in FIG. 9, in modification 4, a unit frame (one frame period) of display drive is temporally divided to two sub-frame periods SFA and SFB, and desired luminance is divisionally expressed by using the sub-frame SFA having high luminance and the sub-frame SFB having low luminance. Thereby, the halftone effect which is similar to that of the case of the multi-pixel structure is obtained. Specifically, based on the image signal D1, the divisional drive operation is performed by temporally dividing the display drive to each pixel 20-4, to the sub-frame periods SFA and SFB. That is, the divisional drive operation at this time is configured with a first drive operation (divisional drive operation to the sub-frame period SFA) and a second drive operation (divisional drive operation to the sub-frame period SFB). In the first drive operation, the divisional drive operation is performed so that the liquid crystal application voltage applied to the liquid crystal element 22 is higher than the input application voltage corresponding to the image signal D1, and on the high voltage side. In the second drive operation, the divisional drive operation is performed so that the liquid crystal application voltage applied to the liquid crystal element 22 is lower than the input application voltage, and on the low voltage side.

In this manner, like modification 4, by providing the capacitive element 24, even in the case where the divisional drive operation is performed by temporally dividing the display drive, it is possible to apply the alignment control capability to liquid crystal molecules, which is similar to that of the embodiment.

Even in the pixel 20-4 in modification 4, the burning prevention circuit as indicated in modification 1 may be provided.

Hereinbefore, although the present invention is described with the embodiment and modifications, the present invention is not limited to the embodiment and the like, and various modifications may be made.

For example, the number of sub-pixels in each pixel and the number of sub-frame periods in one frame period are not limited to two as described hitherto, and may be three or more.

The circuit configuration and the cross-sectional configuration of each pixel are not limited as described in the embodiment and the like, and another configuration may be employed.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:
a liquid crystal display panel including a plurality of pixels each including one or more liquid crystal elements; and
a drive section performing display drive by applying voltage based on an input image signal to the liquid crystal elements in each of the pixels, wherein
the drive section performs divisional drive operation in which the display drive to each of the pixels is spatially or temporally divided so that the divisional drive operation includes a first drive operation and a second drive operation, the first drive operation performing a driving process with a first drive voltage higher than an original application voltage corresponding to the input image signal, and the second drive operation performing a driving process with a second drive voltage lower than the original application voltage, and
the liquid crystal display panel includes:
a TFT substrate and an opposing substrate facing each other;
a liquid crystal layer containing liquid crystal of vertical alignment (VA) mode, and sealed up between the TFT substrate and the opposing substrate;
one or more pixel electrodes provided for each of the pixels on the TFT substrate, each of the pixel electrodes having a plurality of slits;
an opposing electrode provided in common for the pixels on the opposing substrate;
one or more alignment control electrodes provided in one or more regions corresponding to one or more of the slits of the pixel electrode on the TFT substrate, the alignment control electrode configuring a capacitive element in cooperation with the pixel electrode, and electric potential of the pixel electrode being lower than that of the alignment control electrode; and
the first TFT element provided on the TFT substrate to apply a voltage based on the input image signal to the liquid crystal elements through the capacitive element.

2. The liquid crystal display according to claim 1, wherein each of the pixel is divided into a first sub-pixel group and a second sub-pixel group,
the alignment control electrode is provided in each of the first sub-pixel group and the second sub-pixel group, and
the drive section performs, based on the input image signal, space-divisional drive in which the first drive operation and the second drive operation are performed on the first sub-pixel group and the second sub-pixel group, respectively.

3. The liquid crystal display according to claim 2, wherein the first sub-pixel group includes one first sub-pixel, and the second sub-pixel group includes one second sub-pixel, and
each of the pixels is configured so that:
the pixel electrodes correspond to a couple of sub-pixel electrodes each provided in each of the first sub-pixel and the second sub-pixel;
the first TFT element is provided only in the first sub-pixel; and
the sub-pixel electrode in the first sub-pixel and the alignment control electrode in the second sub-pixel are electrically connected to each other to have an common electric potential.

4. The liquid crystal display according to claim 1, wherein a unit frame period is divided into two sub-frame periods, and
the drive section performs, based on the input image signal, time-divisional drive in which the first drive operation and the second drive operation are performed in the two sub-frame periods, respectively.

5. The liquid crystal display according to claim 1, wherein each of the pixels of the liquid crystal display panel includes a second TFT element allowing an electric connection to be established between the pixel electrode and a data line which supplies the input image signal to each of the pixels.

* * * * *